Feb. 13, 1951     R. F. ELLIS     2,541,226
CATTLE HORN TRAINER
Filed Jan. 3, 1948     2 Sheets-Sheet 2

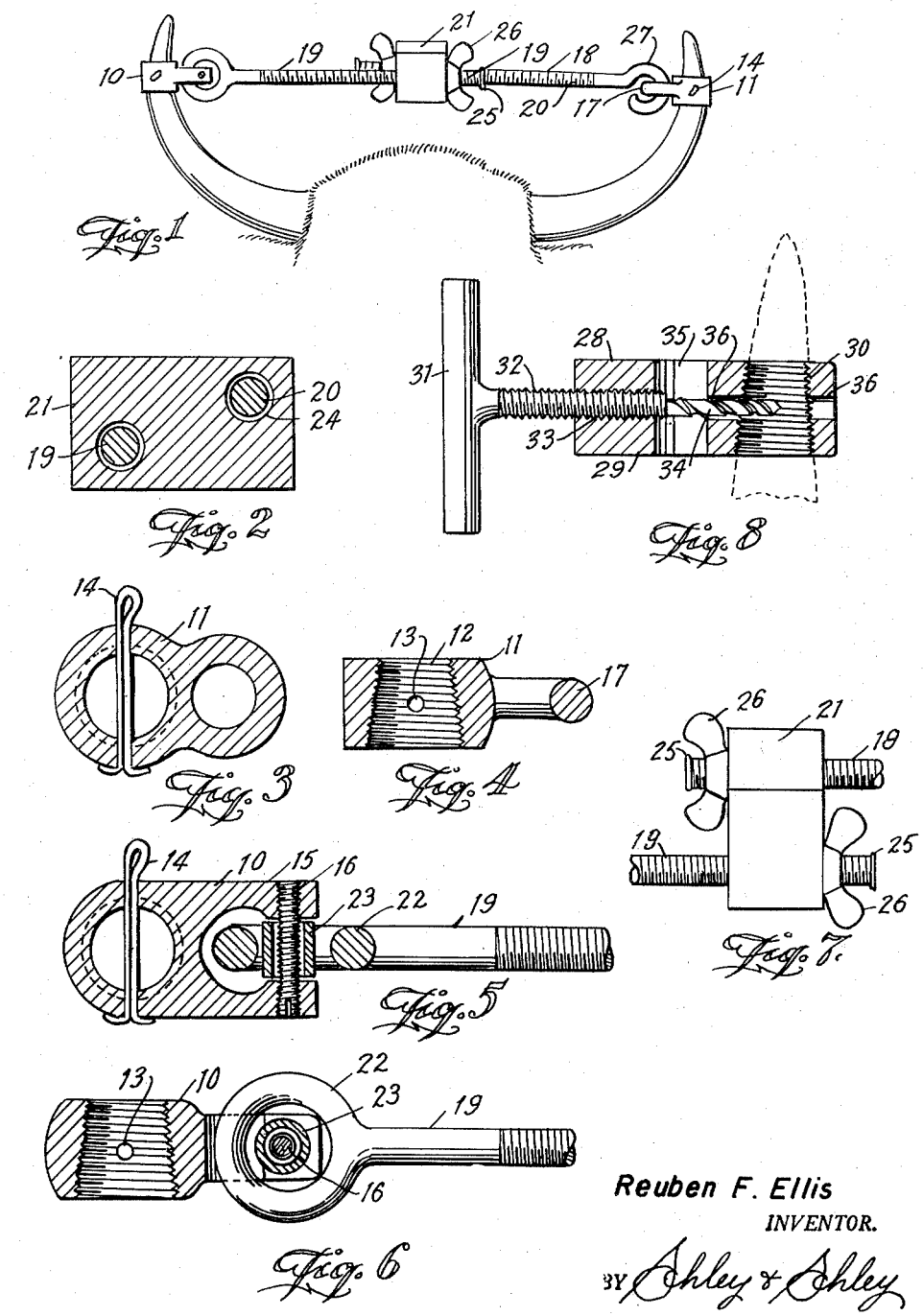

Reuben F. Ellis
Inventor

By Ashley & Ashley

Attorneys

Patented Feb. 13, 1951

2,541,226

UNITED STATES PATENT OFFICE 2,541,226

CATTLE HORN TRAINER

Reuben F. Ellis, Irving, Tex.

Application January 3, 1948, Serial No. 416

5 Claims. (Cl. 128—76)

This invention relates to new and useful improvements in cattle horn trainers.

While a number of devices have been evolved for training cattle horns, none of them, so far as I know, have adequately solved the problem. The tendency of growing horns is to spread as well as to grow out of balance or become misshapen. Of the many devices which have been examined, no one of them possesses all of the essentials necessary to a simple and practical horn trainer. Such devices are either too complicated or too rigid or the parts are insecurely held on the horns and become loose and lost; therefore, one object of the invention is to provide an improved horn trainer that will overcome these difficulties.

A particular object of the invention is to provide an improved horn trainer including clevises which may be so securely fastened on the horns as to preclude accidental or unintentional displacement short of breaking of the horn.

Another object of the invention is to provide an improved horn trainer which while adjustable to place the horns under a pulling stress, will yield to inward pressure exerted by a growing horn and thus, compensate for growth and remedy the tendency of a horn, under such conditions, to drop or grow downward.

Still another object of the invention is to provide a clevis or horn-engaging member which has a tapered, internally screw-threaded bore, together with means for forming screw threads around the horn, whereby said member may be screwed tightly onto the horn and secured by a suitable fastening.

A further object of the invention is to provide an improved horn trainer which, while flexible and yieldable, provides a positive pulling stress and which, if disengaged, cannot be lost.

An important object of the invention is to provide an improved horn trainer, of the character described, having positive means for fastening nuts on each side of its take-up block, whereby unintentional loosening and tightening of such nuts is prevented, and also whereby a positive setting of the trainer is assured.

A construction designed to carry out the invention will be hereinafter described together with other features of the invention.

Figure 9:
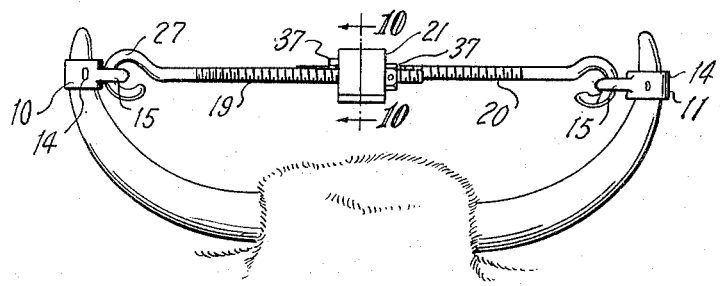
Figure 11:
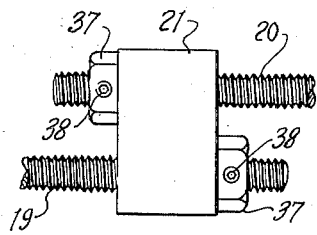
Figure 10:
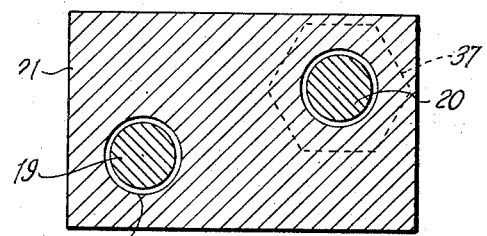
Figure 12:
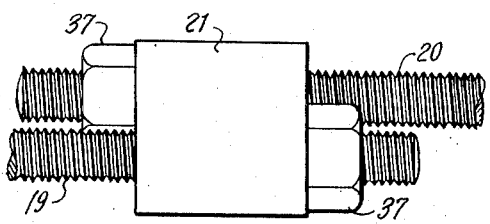
Figure 13:
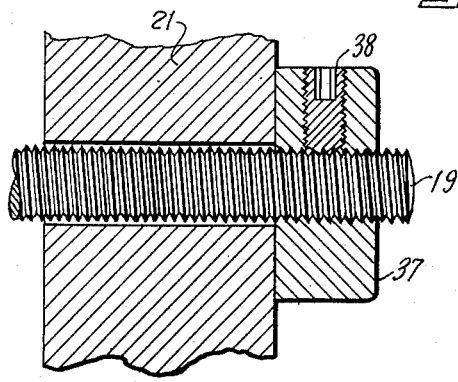

The invention will be more readily understood from a reading of the following specification and by reference to the accompanying drawing, wherein examples of the invention are shown, and wherein:

Fig. 1 is a front elevation of the horns and a portion of the head of a cow equipped with a horn trainer constructed in accordance with the invention, Fig. 2 is an enlarged transverse sectional view through the take-up block, taken on the line 2—2 of Fig. 1, Fig. 3 is an enlarged, horizontal, cross-sectional view of one of the clevis nuts and its cotter pin, Fig. 4 is an enlarged, transverse, vertical, sectional view of the nut with the pin omitted, Fig. 5 is an enlarged, horizontal, cross-sectional view of the other clevis nut and a portion of one of the connecting bars, taken on the line 5—5 of Fig. 1, Fig. 6 is a transverse, vertical, sectional view of the nut and bar shown in Fig. 5, Fig. 7 is an enlarged, front view of the take-up block in the position shown in Fig. 1, Fig. 8 is a transverse, sectional view of the threading and boring tool, Fig. 9 is a front elevation, similar to Fig. 1, showing a modified form of the invention, Fig. 10 is an enlarged, cross-sectional view of the take-up block, taken on the line 10—10 of Fig. 9, Fig. 11 is a reduced plan view of the block shown in Fig. 10, Fig. 12 is an enlarged end elevation of the take-up block, and Fig. 13 is an enlarged, sectional view of a portion of the block showing one of the rods and its nut fastened thereon.

This application is filed as a continuation-in-part of my co-pending application filed July 8, 1946, Serial No. 682,114, abandoned.

In the drawings, the numerals 10 and 11 designate a pair of horn engaging members or clevis nuts. Each of these nuts has a tapered, screw-threaded bore 12, whereby it may be screwed onto the tip end of a horn, also transversely alined openings 13 for receiving cotter pins 14 extending across the bore and through the horns to fasten the nuts thereon. The nut 10 has a reduced yoke 15 integral therewith which is bored and screw-threaded to receive a cross screw 16, having its ends flush with the outer sides of the yoke. The other nut 11 has a laterally-extending eye 17, made integral therewith. The yoke 15 and eye 17 are connected by an adjustable tie member or take-up, indicated generally by the numeral 18.

The take-up includes a pair of bars 19 and 20 and a take-up block 21, in which, the inner ends of the bars are slidable. The bar 19 has an integral eye 22 which loosely surrounds a collar 23 supported on the screw 16 within the yoke 15, whereby the collar is freely rotatable on said screw. The inner ends of the bars pass freely, in opposite directions, through bores 24 in the block and have heads 25 on their inner ends. The bars are screw-threaded and receive wing nuts 26 which engage opposite sides of said block. The bar 20 has a hook 27 on its outer end which engages in the eye 17 of the nut 11.

By observing Fig. 1, it will be apparent that upon tightening the wing nuts 26, the bars 19 and 20 are drawn inwardly, thus placing a pulling stress on the tip ends of the horns which causes them to yield inwardly and grow in a desired shape. The wing nuts can be tightened from time to time to compensate the growth. By arranging the bars 19 and 20 so that they have a free inward sliding movement, no resistance is offered to an inward movement of each horn and thus, if the wing nuts are not adjusted at the proper intervals, the inward growth of the horns will not be impeded and drooping or misshapen horns will not result. Owing to the permanent pivoting of the take-up to the horn nut 10, the trainer cannot be lost if the hook 27 should become disengaged from the eye 17.

In order to prepare the horns for receiving the nuts 10 and 11, I provide a convenient tool 28, illustrated in Fig. 8. The tool includes a pilot block 29 which has a screw-threaded bore 30, which forms a die for cutting the screw threads on the horn to receive the threads of the bores 12. An auger 31 is provided with a screw-threaded shank 32 engaging in a threaded opening 33 in the block, having its longitudinal axis at substantially a right angle to the vertical axis of the bore 30. The inner end portion of the auger 31 is reduced and formed with a bit 34 extending from the shank. The bit extends across an opening 35 in the block and has free passage through transverse pilot openings 36, disposed diametrically of the bore 30.

In applying the trainer to the horns of an animal, it is first necessary to cut screw threads on the horns. The auger 31 of the tool 28 is retracted so as to withdraw the bit 34 from the bore 30 or said auger may be entirely removed. The tool is then placed on the horn which is received in the bore 30. The bore is of such size as to locate the tool, a few inches inwardly from the point of the tip. By rotating the tool with a wrench, screw threads are cut into the horn and said tool is rigidly held on the horn. The auger is then rotated to bore a transverse hole in the horn; after which the auger is retracted and the tool unscrewed from the horn.

The horn nuts 10 and 11 are screwed onto the horns so that the openings 13 register with holes which have been made in the horns. In boring the holes in the horns, some care must be exercised in locating the same so that when the openings 13 are alined therewith, the yoke 15 and the eye 17, will be properly positioned. After the horn nuts have been screwed into position, the cotter pins 14 are inserted and spread. This manner of fastening the horn nuts is important because the animal cannot displace them by drawing a horn across a fence wire, a tree limb or other obstruction. The collar 23 is next placed in the eye 22 and these elements then positioned in the yoke 15, whereupon the screw 16 is inserted in said yoke. The wing nuts 26 are adjusted to lengthen the take-up 18 so that the hook 27 can be engaged in the eye 17. The trainer is now ready to adjust, which is done by screwing the wing nuts against the sides of the take-up block 21. These nuts are adjusted until the desired pulling stress is placed upon the horns. It will be observed that the longitudinal axis of the pulling stress is constant through the take-up 18, the horn nuts and their cotter pin 14; thus, there are no offset or divergent lines of force so far as the pulling stress of the trainer is concerned.

In Figs. 9 to 13, inclusive, I have shown a modified form horn trainer which is preferable to the form shown in Figs. 1 to 8, inclusive. Where the elements of the two forms are substantially alike, the same reference numerals will be used and the description will not be repeated.

In this form, the horn nuts 10 and 11 both have eyes 15 and the rods 19 and 20 each have a hook 27 at the outer end thereof engaging in one of the eyes. Instead of the wing nuts 26, I use hexagonal nuts 37 screw-threaded upon the bars against the opposite flat sides of the block 21. In order to fasten these nuts against accidental or unintentional displacement, suitable set screws 38, preferably of the recessed polygonal socket type, are countersunk therein transverse to the axes of the nuts and tightened against the threads of the bars. This obviates the necessity of upsetting the ends of the bars, as in Fig. 1, to prevent loss of the nuts.

In applying the trainer, the nuts 10 and 11 are secured on the horns as described in connection with Fig. 1. After the nuts 10 and 11 are secured, the rod 19 is hooked into the eye 15 with the block 21 moved along said rod far enough to receive the end of the rod 20 when the latter is hooked to the eye of the nut 11. The block is then centrally adjusted and the nut 37 screwed onto the rod 20. By adjusting the nuts 37, the desired stress may be placed on the horns. After the adjustment is made, the screws 38 are set.

The simplicity and symmetrical structure of the trainer is very advantageous. It will be noted that the horn nuts 10 and 11 are elongated vertically sufficient to reduce the thickness of their annular walls and, except for their inwardly extending eyes 15, are smooth and round. This structure reduces their projection from the surfaces of the horns and, thus, offer less obstruction to fence wires, tree limbs and the like. By use of the cotter pins 14, the nuts will withstand pulling of a wire, caught by one of the nuts, until the wire breaks or is released. The take-up block is solid and is much superior to an ordinary turn-buckle, because an obstruction lodging in the buckle loosens it.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A cattle horn trainer including, a pair of horn nuts having screw-threaded tapered bores, each nut having an eye, take-up bars pivotally engaging the eyes of the nuts, a take-up block in which the bars are slidable, and nuts on the bars engaging the block, the block being between the nut on each bar and the pivotal connection of said bar.

2. A cattle horn trainer including, a pair of horn nuts having screw-threaded tapered bores, take-up bars pivotally connecting the nuts, a take-up block in which the bars are slidable, nuts on the bars engaging the block, the block being between the nut on each bar and pivotal connection of said bar and fastenings extending through the horn nuts and through the horns when the nuts are applied.

3. As a sub-combination in a horn trainer, a horn nut having a tapered bore having conventional screw threads and holes alined transversely of said bore, and an eye integral with the nut.

4. A cattle horn trainer including, a pair of horn nuts each having a tapered screw-threaded bore and diametrically opposed medial holes, keys extending through the holes of the nuts, each horn nut having an integral eye at one side, a pair of bars having hooks at their outer ends engaging in the eyes, a take-up block having smooth bores extending therethrough receiving the inner ends of the bars, and nuts on the inner ends of the bars engaging opposite sides of the block, whereby the bars are free to move longitudinally through the block in opposite directions.

5. The method of training animal horns which includes, screw-threading the tip ends of the horns to be trained, boring holes through the threaded portions of the horns, screwing nuts onto the threaded portions of the horns, passing fastenings through the nuts and the holes in the horns, connecting the nuts and placing the horns under a pulling stress, and thereafter increasing the pulling stress of the horns.

REUBEN F. ELLIS.

REFERENCES CITED

The following references are of record in the file of this patent:

UNITED STATES PATENTS

| Number | Name | Date |
|---|---|---|
| 1,334,200 | Weston | Mar. 16, 1920 |
| 1,836,830 | Achenback | Dec. 15, 1931 |
| 2,445,891 | Staunt | July 27, 1948 |